T. E. Purchase,

Fagot for Railroad Rail,

No. 2,902.

Reissued Mar. 24, 1868.

Witnesses;
J. H. B. Jenkins
J. E. Shaw

Inventor;
Thos. E. Purchase.

United States Patent Office.

THOMAS E. PURCHASE, OF READING, PENNSYLVANIA.

*Letters Patent No.* 19,261, *dated February* 2, 1858; *reissue No.* 2,902, *dated March* 24, 1868.

IMPROVED FAGOT FOR RAILWAY-RAILS.

The Schedule referred to in these Letters Patent and making part of the same.

TO ALL WHOM IT MAY CONCERN:

Be it known that I, THOMAS E. PURCHASE, of the city of Reading, and State of Pennsylvania, have invented a new and useful Improvement in the Manufacture of Railroad-Rails; and I do hereby declare the following to be a full and exact description of the same, reference being had to the annexed drawings, in which—

Figure 1:
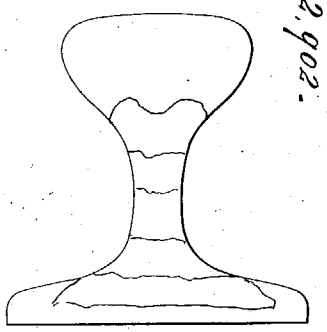

Figure 1 represents a vertical section of a rail constructed on the plan of my improvement.

Figure 2:
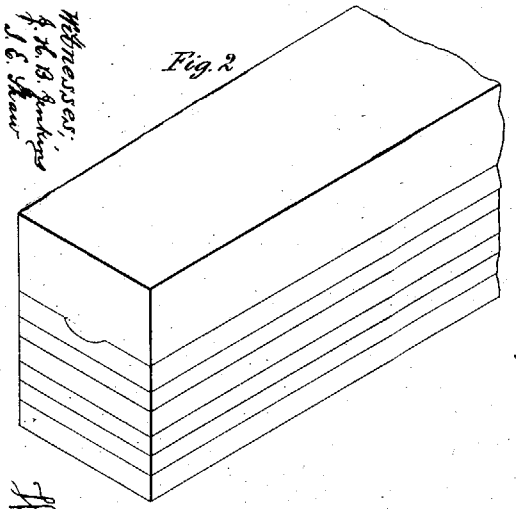

Figure 2, a perspective view of the pile formed on my improved plan.

Figure 3:
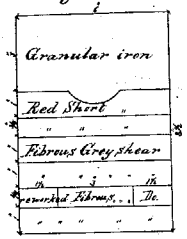

Figure 3, the same shown in section.

Figure 4:
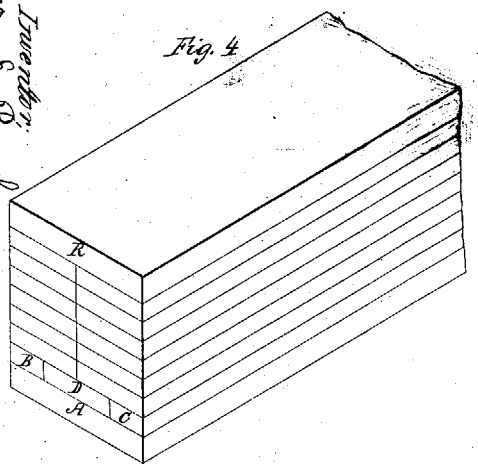

Figure 4, a perspective view of the pile formed in the ordinary method.

Figure 5:
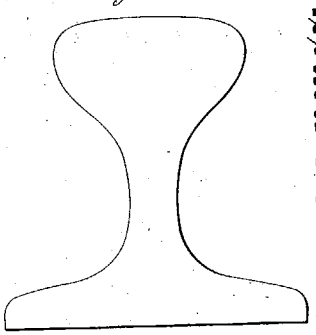

Figure 5, a vertical section of a rail made from the ordinary pile.

Figure 6:
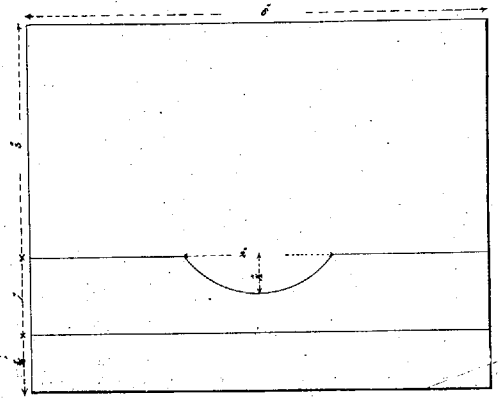

Figure 6 represents the two upper layers shown in fig. 2, in increased size, showing accurately the proportions of the parts.

Heretofore it has been customary to make the pile for rails of a number of flat bars, placed in a series of parallel layers, as shown in fig. 4. It will be seen, on reference to this figure, that the common pile is made up of nine layers of bars, the quality of the iron of which is varied to suit its position in the pile. Thus, the bars A B C, which form the flange of the rail, are of reworked or granular iron. The bar D and other middle bars, which form the stem of the rail, are of an inferior quality of iron. The top bar, R, which covers the head of the rail, and is most liable to wear and tear, is also of the granular iron.

Each of the middle layers is made up of two separate bars, but in my pile these middle layers are single bars, which I have found to increase the strength of the rail.

Preparatory to the operation of rolling the pile, it is introduced into a heating-furnace by means of a piel. In withdrawing the piel, the layers of the pile being loose, are liable to be displaced. The displacement is of frequent occurrence, and can be but imperfectly remedied by the operator, who knocks or presses the displaced layers into something near their proper position. A slight displacement of this kind in the top layer of the pile produces a most injurious effect on the wearing quality of the rail, since, by making said bar oblique to the body of the pile, it is spread unequally and imperfectly over the head of the rail in the operation of rolling. Thus, at some points it will form the side or stem of the rail, and the inferior iron of the middle bars of the pile will be rolled into the head of the rail, rendering it more liable to disintegration and lamination.

My improvement consists in forming the top layer of the pile, which is to be of sufficient size to form the head of the rail, with an irregular welding-surface, and also in providing the layer in contact with the top or cap-piece with an irregular surface, conforming to and matching or fitting into said irregular welding-surface in the top or cap-piece. The size or shape of the irregular welding-surface on either piece is immaterial, the object of my invention being to prevent a displacement of the layers in charging the pile into the heating-furnace.

The pile above described is for a sixty-five pound rail. The advantages of my mode of piling are, that I can produce a rail of less average liability to laminate, and greater average durablility, than can be produced by the ordinary modes of piling.

What I claim, and desire to secure by Letters Patent, is—

1. The manufacture of railroad-rails from a pile, the top bar of which is of a superior quality of iron, immovable laterally, and sufficiently heavy to give the rail when rolled a consolidated head, connecting with the lower layers in the stem of the rail, substantially as above set forth.

2. I also claim an intermediate iron form-piece for a fagot for a railroad-rail, such form-piece being constructed with an irregular welding-surface, for fitting a corresponding welding-surface in the superior metal cap or top-piece, substantially as described.

THOS. E. PURCHASE.

Witnesses:

JOS. T. JOHNSON,

ELLEN C. JOHNSON.